United States Patent
Malhotra et al.

(10) Patent No.: US 7,220,505 B2
(45) Date of Patent: May 22, 2007

(54) AUTOTHERMAL REFORMER-REFORMING EXCHANGER ARRANGEMENT FOR HYDROGEN PRODUCTION

(75) Inventors: Avinash Malhotra, Sugar Land, TX (US); James Hanlan Gosnell, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 475 days.

(21) Appl. No.: 10/708,583

(22) Filed: Mar. 12, 2004

(65) Prior Publication Data

US 2004/0182002 A1    Sep. 23, 2004

Related U.S. Application Data

(60) Provisional application No. 60/320,015, filed on Mar. 18, 2003.

(51) Int. Cl.
 C01B 3/24    (2006.01)
 C01B 3/26    (2006.01)
 C10G 70/02   (2006.01)
 H01M 8/04    (2006.01)

(52) U.S. Cl. ............... 429/17; 208/62; 208/63; 208/64; 208/66; 252/373; 423/650; 423/651; 423/652

(58) Field of Classification Search ............... 252/373; 423/650, 651, 652, 653, 654; 208/62, 63, 208/64, 66; 429/17
See application file for complete search history.

(56) References Cited

U.S. PATENT DOCUMENTS

| | | | |
|---|---|---|---|
| 5,011,625 A | 4/1991 | LeBlanc | 252/376 |
| 5,122,299 A | 6/1992 | LeBlanc | 252/376 |
| 5,362,454 A | 11/1994 | Cizmer et al. | 422/201 |
| 6,855,272 B2 * | 2/2005 | Burlingame et al. | 252/373 |
| 7,074,347 B2 * | 7/2006 | Erikstrup et al. | 252/373 |
| 2003/0171442 A1 * | 9/2003 | Rytter | 518/703 |
| 2004/0047800 A1 * | 3/2004 | Sennoun et al. | 423/652 |

* cited by examiner

*Primary Examiner*—Wayne A. Langel
(74) *Attorney, Agent, or Firm*—Lundeen & Dickinson, LLP; KBR IP Legal

(57) ABSTRACT

Low-energy, low-capital hydrogen production is disclosed. A reforming exchanger 14 is placed in parallel with an autothermal reformer (ATR) 10 to which are supplied a preheated steam-hydrocarbon mixture. An air-steam mixture is supplied to the burner/mixer of the ATR 10 to obtain a syngas effluent at 650°-1050° C. The effluent from the ATR is used to heat the reforming exchanger, and combined reformer effluent is shift converted and separated into a mixed gas stream and a hydrogen-rich product stream. High capital cost equipment such as steam-methane reformer and air separation plant are not required.

19 Claims, 1 Drawing Sheet

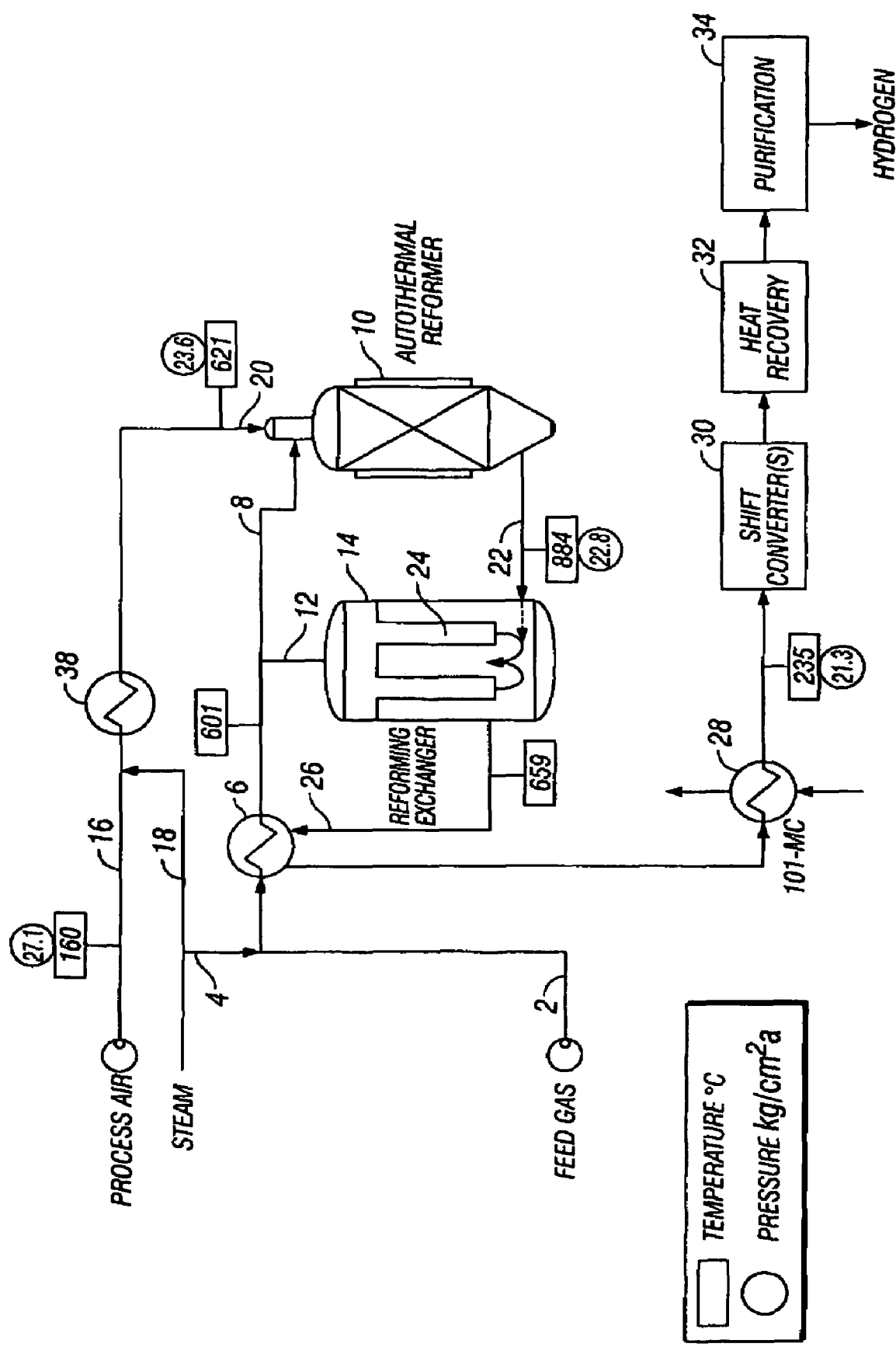

AUTOTHERMAL REFORMER-REFORMING EXCHANGER ARRANGEMENT FOR HYDROGEN PRODUCTION

CROSS REFERENCE TO RELATED APPLICATIONS

This application claims the benefit of our earlier provisional application U.S. Ser. No. 60/320,015, filed Mar. 18, 2003.

BACKGROUND OF INVENTION

This invention relates to the production of a synthesis gas (syngas) using an autothermal reactor (ATR) and a reforming exchanger.

Reforming of hydrocarbons is a standard process applying a plurality of generally endothermic reactions for the production of hydrogen-containing synthesis gas used for manufacturing ammonia or methanol, for example. A conventional autothermal reforming reactor (ATR) is a form of steam reformer including a catalytic gas generator bed with a specially designed burner/mixer to which preheated hydrocarbon gas, air or oxygen, and steam are supplied. Partial combustion of the hydrocarbon in the burner supplies heat necessary for the reforming reactions that occur in the catalyst bed below the burner to form a mixture of mostly steam, hydrogen, carbon monoxide (CO), carbon dioxide ($CO_2$), and the like. Effluent from the steam reformer is then usually further converted in shift converters wherein CO and steam react to form additional hydrogen and $CO_2$, especially for ammonia or other syntheses where hydrogen is a main desired syngas constituent.

Advantages of ATR are low capital cost and easy operation compared to a conventional catalytic steam reformer, for example. Disadvantages of commercial ATR processes are the capital costs, operating difficulties, and plot area requirements associated with the air separation unit (ASU), especially where operating personnel and plot area are limited or other factors make an ASU undesirable. Where the synthesis gas is used for ammonia production, low temperature distillation has been used to remove excess nitrogen and other impurities to obtain a 99.9% purity level.

The present invention addresses a need for producing hydrogen from an ATR without using an ASU and/or low temperature distillation, by operating the ATR with excess air, supplying the ATR process effluent to a reforming exchanger to provide heat for additional syngas production, and partially purifying the product hydrogen stream without the need for low temperature processing for nitrogen rejection. Reforming exchangers used with autothermal reformers are known, for example, from U.S. Pat. Nos. 5,011,625 and 5,122,299 to LeBlanc and U.S. Pat. No. 5,362,454 to Cizmer et al., all of which are hereby incorporated herein by reference in their entirety. These reforming exchangers are available commercially under the trade designation KRES or Kellogg, Brown and Root (KBR) Reforming Exchanger System.

SUMMARY OF INVENTION

The present invention uses a reforming exchanger in parallel with an autothermal reactor (ATR) in a new hydrogen plant with reduced capital costs, reduced energy requirements, greater ease of operation, and reduced NOx and $CO_2$ emissions, or in an existing hydrogen plant where the hydrogen capacity can be increased by as much as 40-60 percent with reduced export of steam from the hydrogen plant. The resulting process has very low energy consumption.

The present invention provides in one embodiment a process for producing hydrogen. The process includes: (a) catalytically reforming a first hydrocarbon portion with steam and air in an autothermal reactor to produce a first syngas effluent at a temperature from 650° to 1050° C., desirably 650° to 1000° C.; (b) supplying the first syngas effluent to a reforming exchanger; (c) passing a second hydrocarbon portion with steam through a catalyst zone in the reforming exchanger to form a second syngas effluent; (d) discharging the second syngas effluent from the catalyst zone adjacent the inlet to form a syngas admixture with the first syngas effluent; (e) passing the admixture across the catalyst zone in indirect heat exchange therewith to cool the admixture and heat the catalyst zone; (f) collecting the cooled admixture from an outlet of the reforming exchanger; (g) shift converting the admixture to obtain a carbon dioxide-rich gas stream lean in carbon monoxide; and (h) separating the carbon-dioxide-rich gas stream to form a hydrogen-lean, mixed gas stream comprising nitrogen and carbon dioxide and a hydrogen-rich product stream.

If desired, the reforming, shift conversion and mixed gas separation can be at a process pressure from 10 to 200 bars, e.g. above 30 bars. The nitrogen and carbon dioxide removal can consist of membrane separation or pressure swing adsorption, or a like unit operation that can simultaneously remove a mixture of gases from the hydrogen at the process pressure and desirably does not require separate sequential steps for carbon dioxide and nitrogen removal. The process desirably includes compressing air to the catalytic reforming with a gas turbine drive and recovering heat from exhaust from the gas turbine. The catalyst zone can include catalyst tubes, and the process can further include: supplying the first syngas effluent to a shell-side of the reformer; supplying the second hydrocarbon portion with steam through the catalyst tubes; and discharging the second syngas effluent from the catalyst tubes adjacent the shell-side inlet to form the syngas admixture. The autothermal reformer can be operated with excess air. The hydrogen-rich gas stream from the shift conversion can have a molar ratio of hydrogen to nitrogen less than 3. The nitrogen and carbon dioxide removal is desirably free of cryogenic distillation, and the process is desirably free of air separation. The proportion of the first hydrocarbon portion relative to a total of the first and second hydrocarbon portions is desirably from 55 to 85 percent. The proportion of the first hydrocarbon portion relative to a total of the first and second hydrocarbon portions is more desireably 60 to 80 percent. The hydrogen product stream can have a purity of at least 70% up to 99.5%, desirably at least 90%, more desirably at least 95%, even more desirably at least 97%, and especially at least 98.5%, by volume. The process can include supplying the hydrogen product stream to a fuel cell for the generation of an electrical current, or to a hydrotreater, e.g. to up-grade a crude oil, or to other refinery processes.

In another embodiment, the invention provides an apparatus for preparing syngas. The apparatus includes: (a) autothermal reactor means for catalytically reforming a first hydrocarbon portion with steam and air to produce a first syngas effluent at a temperature from 650° to 1050° C.; (b) means for supplying the first syngas effluent to an inlet of a reforming exchanger; (c) means for passing a second hydrocarbon portion with steam through a catalyst zone in the reforming exchanger to form a second syngas effluent; (d) means for discharging the second syngas effluent from the catalyst zone adjacent the inlet to form a syngas admixture with the first syngas effluent; (e) means for passing the admixture across the catalyst zone in indirect heat exchange therewith to cool the admixture and heat the catalyst zone; (f) means for collecting the cooled admixture from an outlet from the reforming exchanger; (g) means for shift converting the admixture to obtain a carbon dioxide-rich gas stream lean in carbon monoxide; and (h) means for separating the carbon-dioxide-rich gas stream to form a hydrogen-lean, mixed gas stream comprising nitrogen and carbon dioxide and a hydrogen-rich product stream. The separation means of the apparatus can include a pressure swing adsorption unit or a membrane separator.

BRIEF DESCRIPTION OF THE DRAWINGS

The FIGURE is a simplified schematic process flow diagram of the ATR-reforming exchanger process according to one embodiment of the invention.

DETAILED DESCRIPTION

One embodiment of a process according to the present invention has the general configuration shown in FIGURE. Desulfurized natural gas or other hydrocarbon supplied from line 2 is mixed with process steam from line 4 and the mixture is preheated in a feed preheat exchanger 6. The steam to carbon ratio of the mixture is desirably from 2.0 to 4.0, e.g. about 3. A first portion of the preheated steam-hydrocarbon mixture is fed via line 8 to the burner in autothermal reformer (ATR) 10, and a second portion is supplied via line 12 to the tube-side inlet of reforming exchanger 14. If desired, additional steam can be added via line 36 to line 8.

Air is supplied via line 16 and mixed with steam from line 18, and the steam-air mixture is preheated in preheater 38, e.g. to a temperature from 200° C. to 650° C., and sent to the burner via line 20, taking due care to maintain the flame temperature in the burner below 1500° C. The air is desirably excess air, by which is meant that the resulting molar ratio of hydrogen to nitrogen (following shift conversion) in the syngas is less than about 3 (the typical stoichiometric ratio for ammonia syngas make-up). Using air instead of oxygen or oxygen-enriched air can be economically beneficial where the nitrogen content and/or hydrogen purity of the syngas is not critical, for example, in fuel cells, in the hydrotreatment of crude oil or heavy fractions thereof, or in applications where the nitrogen is inert and the presence thereof does not significantly affect the economics of the method for the use of the syngas. Air can be used as a substitute for pure oxygen when economic or space consideration restrict the use of a conventional air separation unit (ASU), such as when an ATR/reforming exchanger is used for producing hydrogen for use on a floating production storage and offtake (FPSO) facility. If desired, the air can be supplied by a compressor that driven by a gas turbine, and heat recovered from the gas turbine exhaust, for example, to preheat process feed streams, generate process steam, or the like.

The molar ratio of steam to molecular oxygen in the air-steam mixture is desirably from about 0.8 to about 1.8, more desirably about 1 to about 1.6, and the molar ratio of oxygen to carbon in the hydrocarbon feed to the ATR can be from about 0.5 to about 0.8, desirably from about 0.6 to 0.7. The split of the hydrocarbon feed to the ATR 10 (line 8) relative to the total hydrocarbon feed to the ATR 10 and the reforming exchanger 14 (line 2), is desirably from 55 to 85 percent, more desirably from 60 to 80 percent, and particularly 65 to 75 percent to the ATR. The operating conditions and flow rates are generally optimized for maximum hydrogen production.

The syngas effluent in line 22 from the ATR 10 can be supplied to the shell-side inlet of the reforming exchanger 14. The reformed gas from the outlet ends of the catalyst tubes 24 mixes with the ATR effluent and the mixture passes across the outside of the catalyst tubes 24 to the shell-side outlet where it is collected in line 26. The combined syngas in line 26 is cooled in the cross exchanger 6 and waste heat boiler 28 to produce steam for export, and supplied to downstream processing that can include a shift section 30 (which can include high temperature, medium temperature and/or low temperature shift converters), heat recovery 32, mixed gas separation 34 such as CO2 removal (pressure swing adsorption (PSA) or membrane separation, for example), and the like, all unit operations of which are well known to those skilled in the art. The separation 34 is desirably free of low temperature or cryogenic separation processes used to remove excess nitrogen in ammonia syngas production, which require a separate upstream removal system for carbon dioxide that can solidify at the low temperature needed for nitrogen removal.

The heat requirement for the reforming exchanger 14 is met by the quantity and temperature of the ATR effluent. Generally, the more feed to the reforming exchanger, the more heat required to be supplied from the ATR effluent. The temperature of the ATR effluent in line 22 should be from 650° to 1000° C. or 1050° C., and can desirably be as hot as the materials of construction of the reforming exchanger 18 will allow. If the temperature is too low, insufficient reforming will occur in the reforming exchanger 14, whereas if the temperature is too high the metallurgical considerations become problematic. Care should also be taken to ensure that operating conditions are selected to minimize metal dusting. Operating pressure is desirably from 10 to 200 bars or more, especially at least 25 or 30 bars, and can be conveniently selected to supply the hydrogen product stream at the desired pressure, thereby avoiding the need for a hydrogen compressor.

The present invention is illustrated by way of an example. A reforming exchanger installed with an ATR as in the FIGURE where air is used in place of oxygen for 50 MMSCFD hydrogen production has a total absorbed duty in the fired process heater of 38.94 Gcal/hr, and has the associated parameters shown in Table 1 below:

TABLE 1

ATR-Reforming Exchanger Process with Excess Air

| Stream ID: | Catalyst tube inlet, line 12 | ATR feed, line 8 | ATR effluent, line 22 | Shell-side outlet, line 26 | Air-steam to ATR, line 20 |
|---|---|---|---|---|---|
| | Dry Mole Fraction | | | | |
| H2 | 0.0200 | 0.0200 | 0.3578 | 0.4492 | |
| N2 | 0.0190 | 0.0190 | 0.4628 | 0.3561 | 0.7804 |
| CH4 | 0.9118 | 0.9118 | 0.0013 | 0.0036 | |
| AR | 0.0000 | 0.0000 | 0.0055 | 0.0042 | 0.9400 |
| CO | 0.0000 | 0.0000 | 0.0835 | 0.1026 | |
| CO2 | 0.0000 | 0.0000 | 0.0891 | 0.0843 | 0.0300 |
| O2 | 0.0000 | 0.0000 | 0.0000 | 0.0000 | 0.2099 |
| C2H6 | 0.0490 | 0.0490 | 0.0000 | 0.0000 | |
| C3H8 | 0.0002 | 0.0002 | 0.0000 | 0.0000 | |
| Total Flow KMOL/HR (dry) | 312.6 | 713.9 | 4154.2 | 5414.7 | 2446.2 |
| H2O KMOL/HR | 947.7 | 2164.0 | 2827.0 | 3380.6 | 728.9 |
| Total Flow KMOL/HR | 1260.3 | 2878.0 | 6981.2 | 8795.3 | 3175.1 |
| Total Flow KG/HR | 22288 | 50896 | 134887 | 156700 | 83990 |
| Pressure (kg/cm² abs) | 25.9 | 25.9 | 22.4 | 22.1 | 24.0 |
| Temperature (° C.) | 601 | 601 | 1011 | 747 | 621 |

In addition, the data in Table 1 are for an example that represents low capital cost, low energy consumption, easy operation, and reduced NOx and CO2 (56 percent less than a comparable steam reforming hydrogen plant of the same capacity) and CO2 emissions. This process is an attractive option for construction of new hydrogen production facilities where excess nitrogen is desired or can be tolerated, or can be economically removed from the sythesis gas.

As another example, a reforming exchanger is installed with an ATR as shown in the FIGURE wherein air is used as the oxygen source, for a 50 MMSCFD hydrogen production. Typical pressures and temperatures are indicated in the FIGURE for this example, and other associated parameters are shown in Table 2 below:

TABLE 2

ATR-Reforming Exchanger Process with Excess Air Oxidant

| Stream ID: | Catalyst tube inlet 12 | ATR feed line 8 | ATR effluent, line 22 | Shell-side outlet, line 26 | Air-steam to ATR, line 20 |
|---|---|---|---|---|---|
| | Dry Mole Fraction | | | | |
| H2 | 0.0200 | 0.0200 | 0.4115 | 0.4792 | |
| N2 | 0.0023 | 0.0023 | 0.4020 | 0.3089 | 0.7804 |
| CH4 | 0.9612 | 0.9612 | 0.0026 | 0.0227 | |
| AR | 0.0000 | 0.0000 | 0.0048 | 0.0037 | 0.0094 |
| CO | 0.0000 | 0.0000 | 0.0803 | 0.0875 | |
| CO2 | 0.0150 | 0.0150 | 0.0987 | 0.0980 | 0.0003 |
| O2 | 0.0000 | 0.0000 | 0.0000 | 0.0000 | 0.2099 |
| C2H6 | 0.0013 | 0.0013 | 0.0000 | 0.0000 | |
| C3H8 | 0.0002 | 0.0002 | 0.0000 | 0.0000 | |
| Total Flow KMOL/HR (dry) | 371.5 | 754.3 | 4069.7 | 5299.5 | 2094.1 |

TABLE 2-continued

ATR-Reforming Exchanger Process with Excess Air Oxidant

| Stream ID: | Catalyst tube inlet 12 | ATR feed line 8 | ATR effluent, line 22 | Shell-side outlet, line 26 | Air-steam to ATR, line 20 |
|---|---|---|---|---|---|
| H2O KMOL/HR | 1074.8 | 2182.2 | 2610.9 | 3325.1 | 656.2 |
| Total Flow KMOL/HR | 1446.3 | 2936.5 | 6680.5 | 8624.6 | 2750.3 |
| Total Flow KG/HR | 25395 | 51557 | 124039 | 149434 | 72482 |
| Pressure (kg/cm² abs) | 25.5 | 23.6 | 22.8 | 22.5 | 23.6 |
| Temperature (° C.) | 601 | 601 | 884 | 659 | 621 |

The data in Table 2 are also for an example that represents low capital cost, low energy consumption, easy operation, and reduced NOx and CO2 emissions. The effluent recovered from the reforming exchanger includes 47.9% H2, 30.9% N2, 8.8% CO, and 9.9% CO2. The reforming exchanger effluent undergoes shift conversion, as shown in the FIGURE, resulting in an effluent having a composition of 51.9% H2, 28.6% N2, 0.5% CO, and 16.6% CO2. Purification by PSA results in a purified product having a composition of 98.0% H2, 0.80% N2, and 1.0% CH4.

The foregoing description of the invention is illustrative and explanatory of the present invention. Various changes in the materials, apparatus, and process employed will occur to those skilled in the art. It is intended that all such variations within the scope and spirit of the appended claims be embraced thereby.

The invention claimed is:

1. A process for producing hydrogen, comprising:
catalytically reforming a first hydrocarbon portion with steam and excess air in an autothermal reactor to produce a first syngas effluent at a temperature from 650° to 1050° C.;
supplying the first syngas effluent to a reforming exchanger;
passing a second hydrocarbon portion with steam through a catalyst zone in the reforming exchanger to form a second syngas effluent;
discharging the second syngas effluent from the catalyst zone adjacent the inlet to form a syngas admixture with the first syngas effluent;
passing the admixture across the catalyst zone in indirect heat exchange therewith to cool the admixture and heat the catalyst zone;
collecting the cooled admixture from an outlet of the reforming exchanger;
shift converting the admixture to obtain a carbon dioxide-rich gas stream lean in carbon monoxide; and
separating the carbon dioxide-rich gas stream to form a hydrogen-lean, mixed gas stream comprising nitrogen and carbon dioxide and a hydrogen-rich product stream.

2. The process of claim 1, wherein the mixed gas separation comprises membrane separation.

3. The process of claim 1, wherein the mixed gas separation comprises pressure swing adsorption.

4. The process of claim 1, wherein the catalyst zone comprises catalyst tubes, the process further comprising:
supplying the first syngas effluent to a shell-side of the reformer;
supplying the second hydrocarbon portion with steam through the catalyst tubes;
discharging the second syngas effluent from the catalyst tubes adjacent the shell-side inlet to form the syngas admixture.

5. The process of claim 1 wherein the carbon dioxide-rich gas stream from the shift conversion comprises a molar ratio of hydrogen to nitrogen less than 3.

6. The process of claim 1 wherein the mixed gas separation is free of cryogenic separation.

7. The process of claim 1 wherein the process is free of air separation.

8. The process of claim 1 wherein a proportion of the first hydrocarbon portion relative to a total of the first and second hydrocarbon portions is from 55 to 85 percent.

9. The process of claim 1 wherein a proportion of the first hydrocarbon portion relative to a total of the first and second hydrocarbon portions is from 60 to 80 percent.

10. The process of claim 1 wherein the hydrogen product stream has a purity of at least 70 volume percent.

11. The process of claim 10, wherein the hydrogen product stream has a purity of from 90 to 99.5 volume percent.

12. The process of claim 1, wherein the hydrogen product stream has a purity of at least 95 volume percent.

13. The process of claim 1, wherein the hydrogen product stream has a purity of at least 97 volume percent.

14. The process of claim 1, wherein the hydrogen product stream has a purity of at least 98.5 volume percent.

15. A process for generating an electrical current comprising the process of claim 1 and supplying the hydrogen-rich product stream to a fuel cell.

16. A hydrotreating process comprising the process of claim 1 and supplying the hydrogen-rich product stream to a hydrotreater.

17. The process of claim 1, wherein the reforming, shift conversion and mixed gas separation comprise a process pressure from 10 to 200 bars.

18. The process of claim 17, wherein the reforming, shift conversion and mixed gas separation comprise a process pressure of at least 30 bars.

19. The process of claim 1, further comprising compressing air to the catalytic reforming with a gas turbine drive and recovering heat from exhaust from the gas turbine.

* * * * *